United States Patent [19]

Koper et al.

[11] Patent Number: 4,695,520
[45] Date of Patent: Sep. 22, 1987

[54] ELECTROCHEMICAL RESERVE BATTERY

[75] Inventors: Kenneth T. Koper, Hatfield, Pa.; Sylvester L. Willard; Larry A. Abramowski, both of Fredericksburg, Va.

[73] Assignee: The United States of America as represented by the Secretary of the Navy, Washington, D.C.

[21] Appl. No.: 911,615

[22] Filed: Sep. 25, 1986

[51] Int. Cl.$^4$ .............................................. H01M 6/32
[52] U.S. Cl. ...................................... 429/116; 429/113
[58] Field of Search ............... 429/113, 114, 115, 116, 429/117, 52

[56] References Cited

U.S. PATENT DOCUMENTS

| | | | |
|---|---|---|---|
| 2,824,164 | 2/1958 | Bauman | 429/115 |
| 2,905,741 | 9/1959 | Smith et al. | 429/116 |
| 3,005,863 | 10/1961 | Floyd et al. | 429/115 |
| 3,018,314 | 1/1962 | Cooper et al. | 429/115 |
| 3,067,274 | 12/1962 | Heinsohn et al. | 429/115 |
| 3,075,035 | 1/1963 | Kardorff et al. | 429/115 |
| 3,132,974 | 5/1964 | Gold | 429/115 |
| 3,173,812 | 3/1965 | Klein | 429/116 |
| 3,298,868 | 1/1967 | Smith et al. | 429/115 |
| 3,460,993 | 8/1969 | Saunders et al. | 429/115 |
| 3,619,298 | 11/1971 | Jammet et al. | 429/116 |
| 3,674,566 | 7/1972 | Powers | 429/116 |
| 3,743,545 | 7/1973 | Merz et al. | 429/115 |
| 4,049,888 | 9/1977 | Flender | 429/115 |
| 4,477,543 | 10/1984 | Bjorlund | 429/116 |

Primary Examiner—Brian E. Hearn
Assistant Examiner—Steven P. Marquis
Attorney, Agent, or Firm—Henry Hansen

[57] ABSTRACT

A reserve or deferred action battery stores electrolyte about a collapsed bellows in a separate chamber sealed from the cell compartments by a rupturable disk. Compressed gas for expanding the bellows and expelling the electrolyte is contained within a rigid spiral tube within the bellows. A frangible end of the tube is broken off by initial expansion of the bellows when the disk is ruptured and permits the electrolyte to flow into the cell compartments and generate electrical energy.

3 Claims, 5 Drawing Figures

ELECTROCHEMICAL RESERVE BATTERY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to an electrochemical reserve battery, and more particularly to such a battery including apparatus for storing and transferring electrolyte from a common reservoir to each cell compartment for activation and immediate operation.

A reserve or deferred action battery consists of two main components: a plurality of cells, anodes, cathodes and separators; and an electrolyte. The electrolyte is physically separated from the cells until electrical energy is needed. Such a battery is useful where it is to be stored for an extended period of time. It has been particularly useful in the newer high energy density lithium batteries which are more prone to explosive reactions after the electrolyte is pumped into the cells.

There are various methods in the prior art for pumping electrolyte into the cells of a reserve battery, but only a few lend themselves to the compact cylindrical configurations required in air-launched buoys and the like. In one embodiment, the electrolyte is initially stored in an expanded bellows and prevented from entering the cells by a burst disk. High pressure gas around the bellows creates a differential pressure. When electrical energy is needed, the burst disk is actuated and ruptured, and the differential pressure collapses the bellows pumping the electrolyte into the cells, thereby activating the battery. Unfortunatey, this embodiment experiences battery failures under certain conditions of vibration. Cracks develop in the bellows when vibrated in the expanded position such that the differential pressure is lost and the electrolyte cannot be pumped into the individual cells. The cracks occur because the bellows, in conjunction with the considerable weight of the electrolyte, acts like a cantilevered beam producing high stresses on the bellows that exceed the design limits.

SUMMARY OF THE INVENTION

Accordingly, it is an object of the present invention to provide an electrochemical reserve battery in which the electrolyte is separately and safely stored in a shock and vibration resistant container. Another object is to provide a reserve battery having a compact configuration particularly suitable for use in air-launched buoys and the like. Still other objects are to provide electrolyte storage and transfer suitable for safe use with lithium batteries, to provide an auxiliary supply of high pressure gas for the positive transfer of electrolyte into the cell compartments of the battery, and to provide a reserve battery which is relatively simple to manufacture, maintain and operate.

Briefly, these and other objects of the invention are accomplished with a chamber completely filled with electrolyte which is separated from adjacent cell compartments by a rupturable disk. A fully compressed bellows within the chamber maintains a low pressure in the electrolyte. A rigid spiral tube within the bellows contains high pressure gas releasable by a frangible cap connected through a short lanyard to the bellows. When the disk is ruptured and electrolyte flows into the cell compartments, the pressure in the chamber is reduced permitting the bellows to expand initially beyond the length of the lanyard causing the cap to break. This allows the high pressure gas to expand the bellows further and complete the transfer of electrolyte to the cells of the battery.

For a better understanding of these and other objects and aspects of the invention, reference may be made to the following detailed description taken in conjunction with the accompanying drawings wherein:

DESCRIPTION OF THE PREFERRED EMBODIMENT

Figure 1:
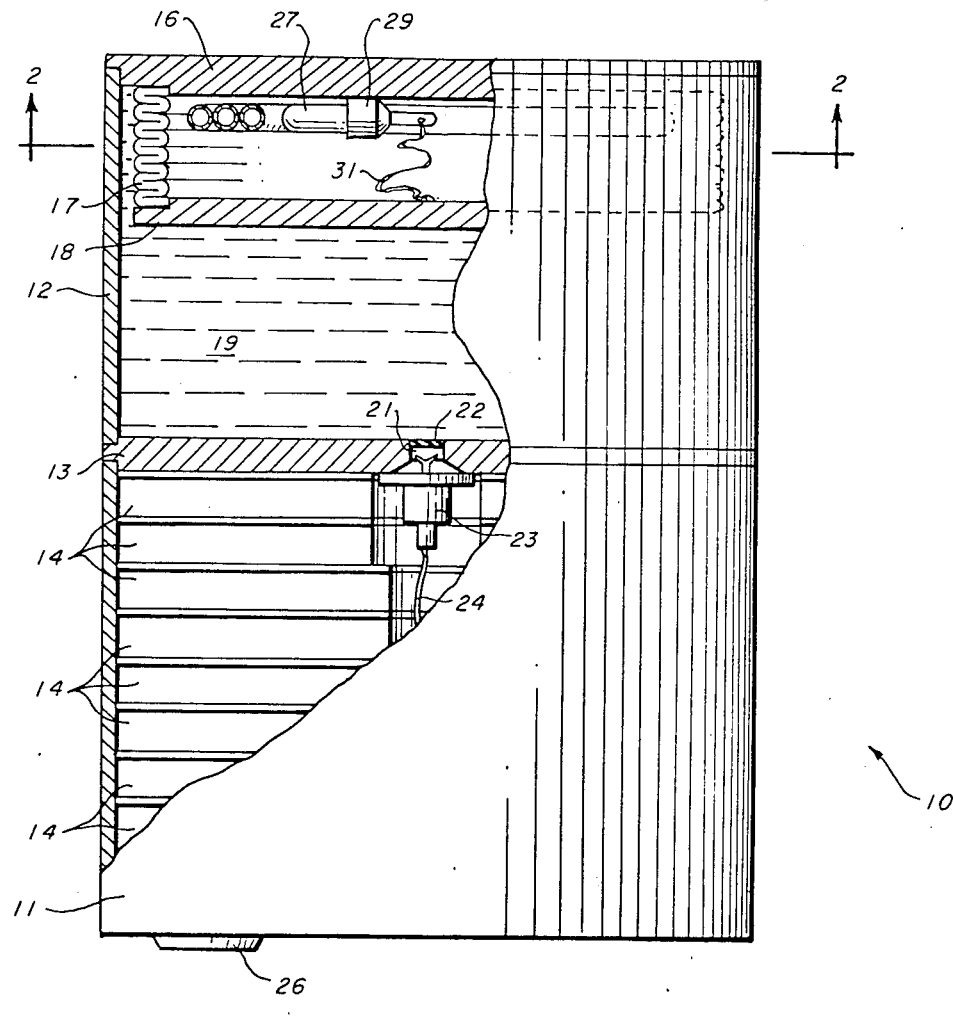
FIG. 1 is a longitudinal view of a lithium reserve battery according to the invention partially in cross-section.
Figure 3:
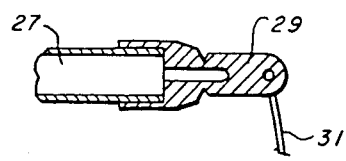
FIG. 3 is a cross-sectional view of one portion of the battery taken along the line 3—3 of FIG. 2.
Figure 2:
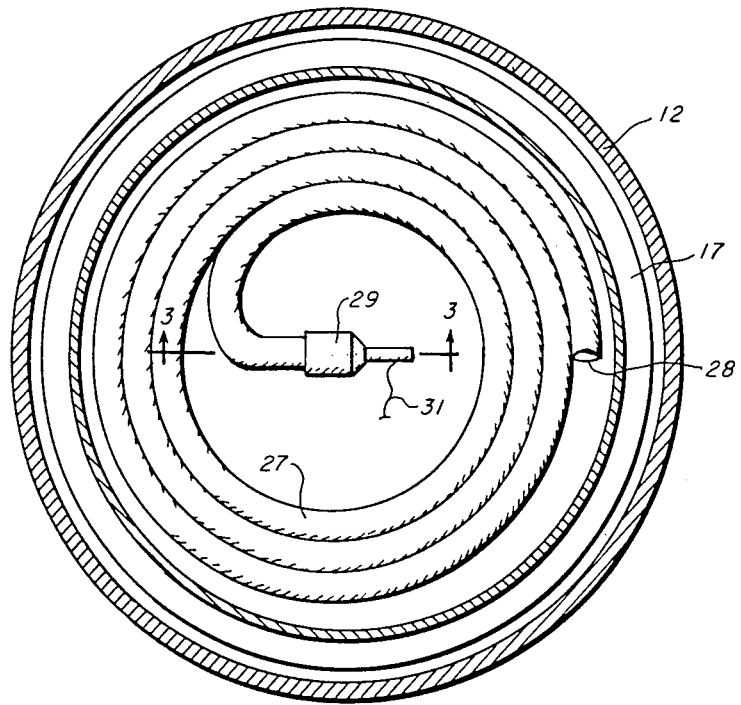
FIG. 2 is a transverse cross-sectional view of the battery taken along the line 2—2 of FIG. 1.

Referring now to the drawings wherein like characters designate like or corresponding parts throughout the several views, there is shown in FIG. 1 a lithium reserve battery 10 having two coaxial cylindrical casings 11 and 12 sealingly joined at their confronting ends by a wall 13. Casing 11 contains a stack of cell compartments 14, each cell having annular anode and cathode plates and separators suitable for lithium-type reserve or deferred action batteries and arranged for receiving an appropriate incompressible electrolyte 19 flowing from their center openings.

The distal end of casing 12 is sealed by a cover 16 and encloses a fully compressed bellows 17, one end being attached to cover 16 and the other end to a pressure plate 18. The electrolyte 19 fills the remaining volume enclosed by casing 12 at a pressure sufficient to maintain bellows 17 under full compression to ensure maximum storage capacity of electrolyte 19.

Wall 13 includes a central orifice 21 for communicating between the electrolyte 19 in casing 12 and the central openings of cells 14. A rupturable disk 22 prevents communication until pierced by a spike 23 which is electrically activated through wires 24 connected to a separate power source, not shown, through an external terminal 26.

Secured to cover 16 within belows 17 is a rigid spiral tube 27 containing a high pressure gas and closed at the outer end 28. The inner end of tube 27 is sealed with a frangible break-off cap 29 having a short lanyard 31 connected to pressure plate 18. The length of lanyard 31 is selected to break off cap 28 with initial expansion of bellows 17 as the electrolyte 19 is expelled through orifice 21. Tube 27 is preferably constructed of AISI 300 series stainless steel because it is work hardenable and actually increases in strength after being deformed from bending. This enables the tube to be wrapped into a small spiral to fit into small spaces yet withstand greater pressures without increasing wall thickness.

Figure 4A:
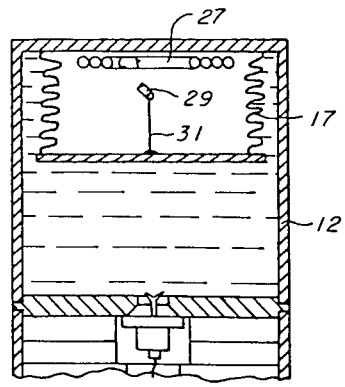
FIGS. 4A and 4B are schematic illustrations of the battery at different stages of operation.
Figure 4B:
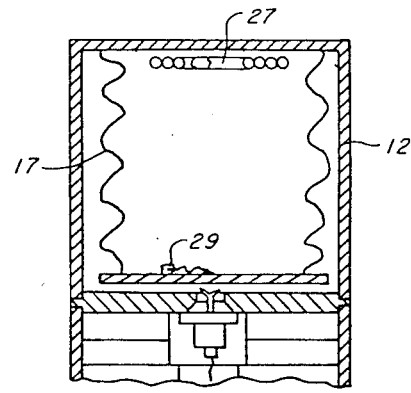

Operation of the invention is as follows. When battery activation is desired, an electrical signal is transmitted through wires 24 to spike 23 which ruptures disk 22. Due to the compression force applied by bellows 17 electrolyte 19 begins to flow through opening 21 into cells 14 allowing the bellows 17 to expand. In FIG. 4A, the bellows 17 has expanded to a point where lanyard 31 became taut and broke cap 29 allowing high pressure gas from tube 27 into bellows 17. In FIG. 4B, the high pressure gas in tube 27 has expanded bellows 17 to its full length in cylinder 12 thereby expelling substantially all of the electrolyte 19 into cells 14.

Some of the many advantages and novel features of the invention should now be apparent. For example, an electrochemical reserve battery is provided in which the electrolyte is separately and safely stored in a shock and vibration resistant container. The elements for transferring the electrolyte into the cell compartments enables a compact configuration particularly suitable for use in air-launched buoys, lithium batteries, and similar devices. An auxiliary supply of high pressure gas is available for the positive trasnfer of the electrolyte into the cell compartments of the battery.

It will be understood that various changes in the details, steps and arrangement of parts, which have been herein described and illustrated in order to explain the nature of the invention, may be made by those skilled in the art within the principle and scope of the invention as expressed in the appended claims.

What is claimed is:

1. An electrochemical reserve battery comprising in combination:

a housing including a separating wall forming two sealed chambers;

a stack of dry cells disposed in one of said chambers;

an expandable container occupying a portion of the space within the other of said chambers;

an electrolyte completely filling the unoccupied space at a pressure sufficient to collapse said container;

a source of high pressure gas within said container;

frangible means operatively connected between said source and said container for releasing the gas into said container at a preselected expansion thereof; and actuating means operatively connected to said separating wall for selectively establishing communication between said chambers for permitting said electrolyte to transfer to said cells.

2. A battery according to claim 1 wherein said container includes a sealed bellows secured at one end to said housing, and said gas source includes a rigid spiral tube secured to the one end of said bellows.

3. A battery according to claim 2 wherein said frangible means includes a break-off cap secured to the inner end of said tube, and a lanyard attached between said cap and the one end of said bellows, the length of said lanyard being less than the fully expanded length of said bellows.

* * * * *